United States Patent
Yai et al.

(10) Patent No.: US 8,573,555 B2
(45) Date of Patent: Nov. 5, 2013

(54) SUPPORT STRUCTURE OF OPERATION PANEL FOR MACHINE TOOL

(75) Inventors: Akira Yai, Gifu-pref. (JP); Kazuaki Furukawa, Aich-pref. (JP); Taku Yamazaki, Aichi-pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 13/635,211

(22) PCT Filed: Oct. 6, 2010

(86) PCT No.: PCT/JP2010/067583
§ 371 (c)(1),
(2), (4) Date: Sep. 14, 2012

(87) PCT Pub. No.: WO2012/046315
PCT Pub. Date: Apr. 12, 2012

(65) Prior Publication Data
US 2013/0003276 A1    Jan. 3, 2013

(51) Int. Cl.
*F16M 13/00*    (2006.01)
(52) U.S. Cl.
USPC .......................................... 248/594; 248/592
(58) Field of Classification Search
USPC .................... 248/292.11, 592, 594, 560, 637; 267/137
See application file for complete search history.

(56) References Cited

U.S. PATENT DOCUMENTS

2005/0284715 A1* 12/2005 Kojima et al. ............ 188/322.19
2010/0219290 A1*  9/2010 Luce ......................... 244/102 SL

FOREIGN PATENT DOCUMENTS

| EP | 2110200 | 10/2009 |
|---|---|---|
| JP | 62-159242 | 10/1987 |
| JP | 63-74544 | 5/1988 |
| JP | 2-238916 | 9/1990 |
| JP | 03-79826 | 4/1991 |
| JP | 07-040305 | 2/1995 |
| JP | 09-267230 | 10/1997 |
| JP | 11-221715 | 8/1999 |
| JP | 2001-157945 | 6/2001 |
| JP | 2001-191381 | 7/2001 |
| JP | 2004-116779 | 4/2004 |
| JP | 2005-034933 | 2/2005 |
| JP | 2008-200795 | 9/2008 |

OTHER PUBLICATIONS

International Search Report (with partial English translation) and Written Opinion for corresponding International Application No. PCT/JP2010/067583 mailed Dec. 14, 2010.
Notification of Reasons for Refusal for corresponding Japanese Application No. 2011-500402 dated Mar. 8, 2011 and English translation.
Extended European Search report dated Jul. 5, 2013 in connection with corresponding European patent application No. 10858123.2.

* cited by examiner

*Primary Examiner* — Todd M. Epps
(74) *Attorney, Agent, or Firm* — Renner, Otto, Boisselle & Sklar, LLP

(57) ABSTRACT

The present invention provides capability to instantaneously adjust a height of an operation panel to an optimal height in accordance with a height of an operator with extremely easy operation and slight operating force. The operation panel is attached to a housing side wall of a machine tool in a vertically movable manner, supporting a load of the operation panel by the housing through a gas spring with a hydraulic lock. The operation panel is set to be capable of being vertically adjusted in position by disposing a handling unit which releases the hydraulic lock of the gas spring at the vicinity of the lower side of the operation panel.

7 Claims, 9 Drawing Sheets

SUPPORT STRUCTURE OF OPERATION PANEL FOR MACHINE TOOL

TECHNICAL FIELD

The present invention relates to an operation panel for a machine tool such as a machining center, and particularly, relates to a supporting mechanism thereof.

BACKGROUND ART

An operation panel for a machine tool such as a machining center is to input various processing conditions (processing data, processing procedure, tools to utilize, and the like) for a workpiece and to perform action at the time of error occurrence. Owing to large influence thereof to processing accuracy and yield ratio, extremely careful operation is required of an operator.

Such an operation panel is required to be operated while confirming a processing state in the machine tool and is often installed and fixed to the inside of a concave area along a perpendicular wall of a machine tool casing (housing) so not to be protruded from the viewpoint of space efficiency. Since male operators had a majority in the past, an installation height of such an operation panel was determined based on an average height of men.

On the other hand, various proposals have been traditionally made to improve operability of the operation panel.

More specifically, in disclosure of Patent Literature 1 described below, an operation panel for a machine tool and the like with which a vertical position and inclining angle of the operation panel are set to be adjustable by attaching the operation panel to a slide rail adjustably in angle and connecting the slide rail slidably to a guide rail of a stand.

In disclosure of Patent Literature 2 described below, an operation panel for a machine tool with which posture can be changed owing to that the operation panel is set to be rotatable about an oblique axis line and a perpendicular axis line.

In disclosure of Patent Literature 3 described below, an operation panel for a machine tool is swingably supported and a positioning thereof is maintained with a gas-sealed spring as being drawn to an operator with one-touch operation. In disclosure of Patent Literature 4 described below, an operation panel is set to be movable in a vertical direction so as not to disturb attaching and detaching of a workpiece.

CITATION LIST

[Patent Literature]
 [Patent Literature 1]: Japanese Patent Application Laid-Open No. 2001-157945
 [Patent Literature 2]: Japanese Patent Application Laid-Open No. 2008-200795
 [Patent Literature 3]: Japanese Patent Application Laid-Open No. 9-267230
 [Patent Literature 4]: Japanese Patent Application Laid-Open No. 2005-34933

SUMMARY OF INVENTION

Technical Problem

Recently, since operation of an operator such as operation using a machining center and the like requires precise attention and patience, female participation is becoming popular. Cases frequently occur such as that a specific machining center is turned over from a large male operator to a small female operator or vice versa corresponding to shift of working hour.

In such cases, when the operation panel is installed suited to an average height of large male operators, the position of the operation panel is too high and visibility of a display and operability of operation buttons are poor for a small female operator. On the other hand, when the operation panel is installed suited to a small female operator, the position of the operation panel is too low and one's hip bowing is required for a large male operator. In either case, since operation under unnatural posture has been forced, operation error has been caused by fatigue triggering and visibility worsening.

According to Patent Literature 1 described above, although the vertical position of the operation panel can be adjusted, it is required for the above to determine the vertical position while depressing a compression spring or a damper and to fix knob bolts at both sides after loosening both knob bolts. Therefore, operating ratio of the machine tool is to be lowered owing to that operability is poor and extreme difficulty is accompanied for a weak woman.

Further, Patent Literature 2 or 4 described above only enables to adjust the inclining angle and the like of the operation panel and to evacuate the operation panel. Thus, adjusting to an optimal position cannot be performed against operator height difference reaching 30 cm or more.

Here, the present invention enables both small female operators and large male operators to operate the operation panel in an optimal posture by enabling to instantaneously adjust the height of the operation panel in accordance with the height of the operator with extremely easy operation and slight operating force.

Solution to Problem

To solve the above problems, in a support structure of an operation panel for a machine tool such as a machining center of the present invention, the operation panel is set to be capable of being vertically adjusted in position by attaching the operation panel to a housing side wall of the machine tool in a vertically movable manner, supporting a load of the operation panel by the housing through a gas spring with a hydraulic lock, and placing a handling unit which releases the hydraulic lock of the gas spring at the vicinity of the lower side of the operation panel.

Advantageous Effects of Invention

Since the support structure of operation panel for machine tool of the present invention is structured as described above, the load of the operation panel is supported by the gas spring with the hydraulic lock and the operation panel can be instantaneously adjusted to an optimal height in accordance with the height of the operator just by operating the handling unit to release the hydraulic lock.

DESCRIPTION OF EMBODIMENTS

Figure 1:
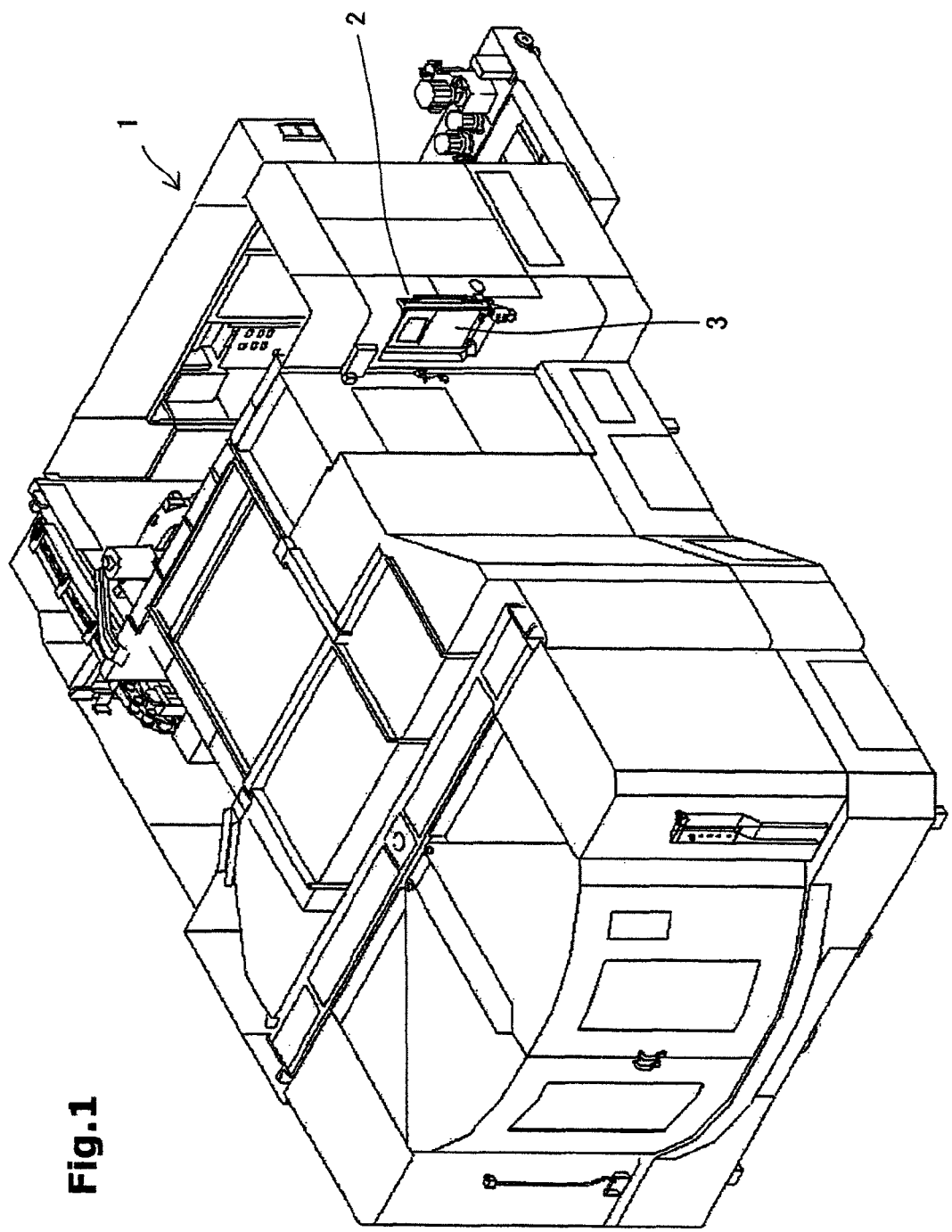
FIG. 1 is an overhead view of a machining center adopted in a support structure of an operation panel of the present invention.

FIG. 1 illustrates an overhead view of a machining center 1 including an operation panel supporting mechanism according to the present invention. A processing chamber is laid out in the front side, and a drive source and a control chamber are laid out in the rear side. The drive source which drives tools and workpieces, and control units including a computer, are arranged in the control chamber.

An operation panel 3 is arranged in a concave area 2 so as not to be protruded from a side wall face wherein the concave area 2 is located at the side wall of the control chamber in the rear side.

Figure 2:
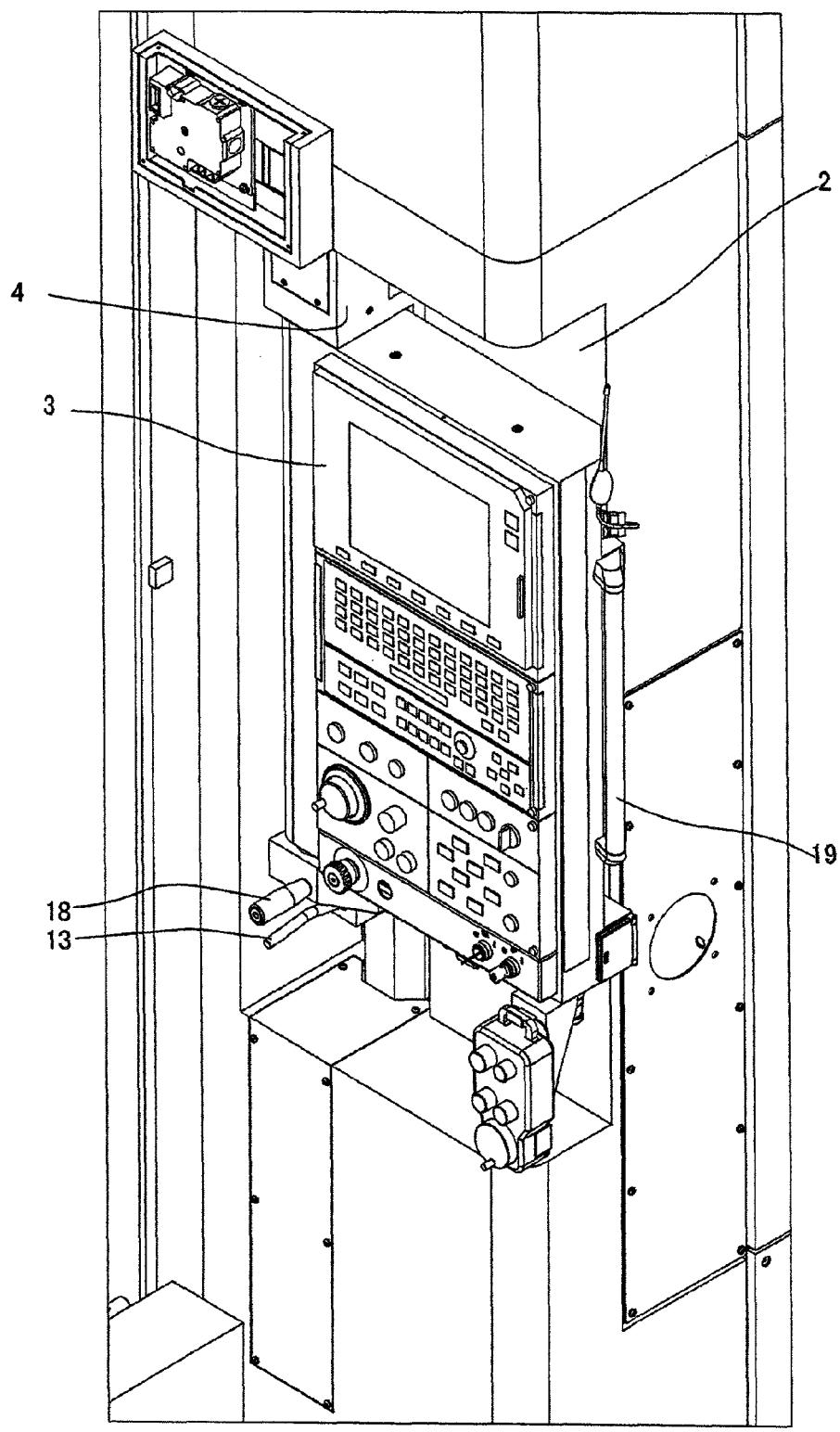
FIG. 2 is an overall view of the support structure of the operation panel of the present invention.
Figure 3:
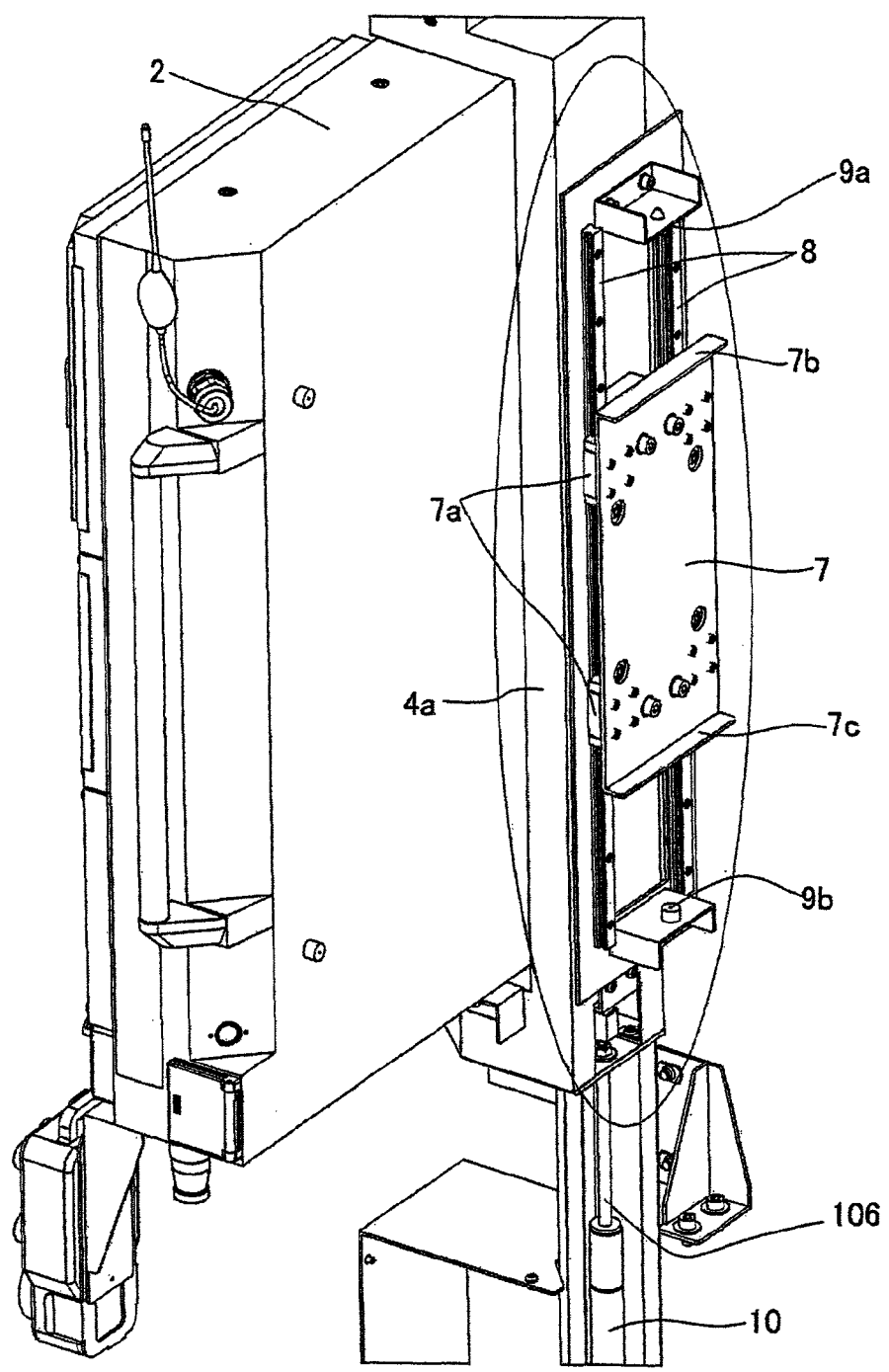
FIG. 3 is a view illustrating an attaching structure of a linear guide and a linear guide rail.
Figure 4:
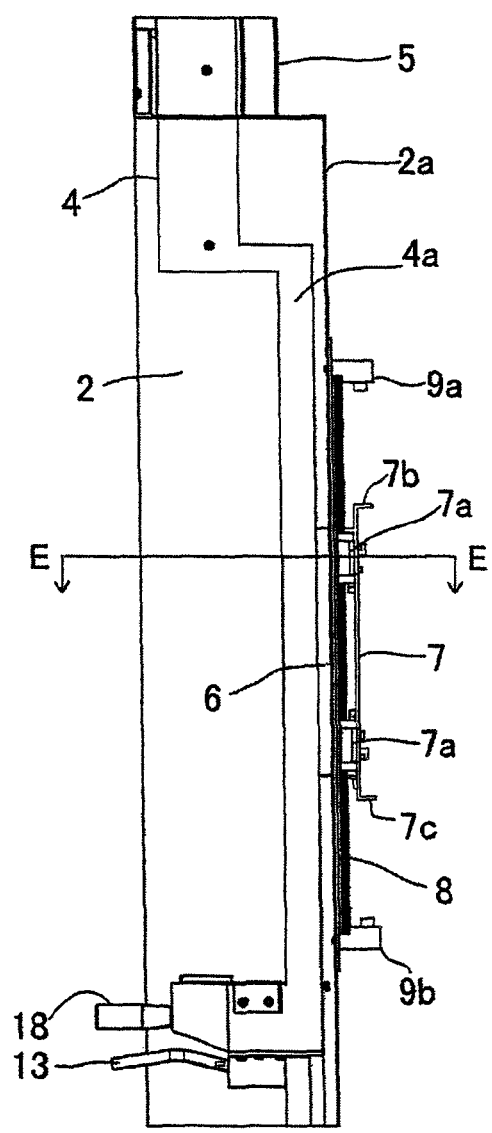
FIG. 4 is a side view of an attaching portion of the linear guide and the linear guide rail.

As illustrated in FIGS. 2 to 4, a hollow supporting column 4 having a U-shaped concave portion 4a formed at a lower end thereof is arranged in the concave area 2. As illustrated in detail specifically in FIG. 4, the upper part of the supporting column 4 is inserted to upper space 5 of the concave area 2 of the machining center 1.

Figure 5:
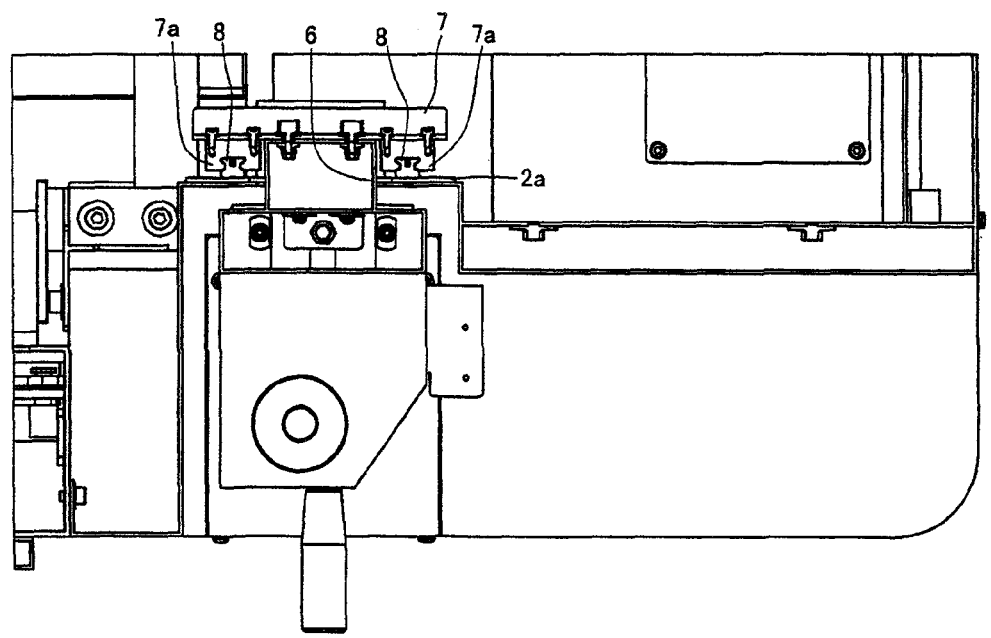
FIG. 5 is a view viewing section E-E of FIG. 4 from the above.

As illustrated in FIGS. 3 to 5, a pair of upper and lower linear guides 7a are attached to the rear side of the U-shaped concave portion 4a at both right and left sides via a spacer 6 and a supporting plate 7. Further as illustrated in FIGS. 3 to 5, linear guide rails 8 which extends in a vertical direction is fixed to a housing rear face 2a in the concave area 2 of the machining center 1 with a bolt.

As illustrated in FIG. 5 which is a view viewing section E-E of FIG. 4 seen from the above, the linear guide rails 8 have a rail portion with an approximate triangle sectional shape along the respective right and left side faces and groove portions into which rail portions at both right and left side faces are respectively inserted and which are fitted to the respective rail portions are formed at the respective linear guides 7a at both right and left sides. Therefore, the supporting column 4 can be smoothly moved vertically within the concave area 2 without slipping.

Here, wiring which connects the operation panel 3 and the computer and the like in the control chamber goes through a hollow part of the supporting column 4, and curled wires are used in the hollow part of the supporting column 4, for example, so that they can be smoothly moved in vertical direction.

Since stoppers 9a, 9b which include a cushion material such as rubber are arranged on the upper and lower end parts of the linear guide rails 8 opposing to flanges 7b, 7c arranged on the upper and lower ends of the supporting plate 7, the operation panel 3 is slidable within the vertical range where flanges 7b, 7c arranged on the upper and lower ends of the supporting plate 7 are abutted to stoppers 9a, 9b. In the present embodiment, the vertical position of the operation panel 3 can be adjusted for approximately 30 cm. Incidentally, comfortable operation can be performed for both female operator with height being approximately 150 cm and male operator with height being over 180 cm by enabling adjustment of the position of the screen center of the operation panel 3 from the floor surface of the machining center 1 to be from the lowest position being 151.5 cm to the highest position being 178 cm.

As illustrated in FIG. 3, the vertical position adjustment is performed by a gas spring with a hydraulic lock 10 connected to a bottom face of the U-shaped concave portion 4a.

Figure 6:
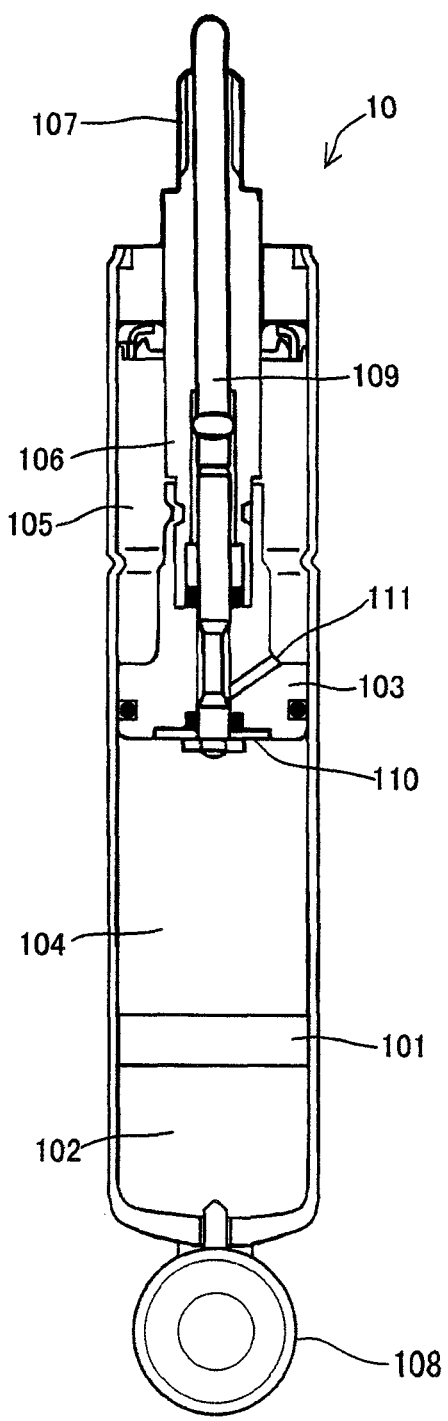
FIG. 6 is a view illustrating an inner structure of a gas spring with a hydraulic lock.

The structure of the gas spring with the hydraulic lock 10 (manufactured by TOKICO) utilized in the present invention is illustrated in FIG. 6. A compressed gas chamber 102 where compressed gas is enclosed with a free piston 101 is disposed below the gas spring with the hydraulic lock 10 and a lower side oil chamber 104 and an upper side oil chamber 105 is separated by a piston 103 located above the gas spring with the hydraulic lock 10.

An attaching portion 107 is arranged on an upper end of a piston rod 106 which is protruded upward from the piston 103. The attaching portion 107 is connected to a lever attaching plate 11 (see FIG. 7) which is attached to the bottom face of the U-shaped concave portion 4a, as described later. As illustrated in FIG. 8, a circular attaching portion 108 at the lower end of the gas spring with the hydraulic lock 10 is swingably connected to a rod 12 which is attached to the machining center 1 side such as a base of the machining center 1 via a flange and the like so that slight fluctuation occurring as being accompanied with vertical movement of the supporting column 4 can be absorbed.

As illustrated in FIG. 6, a pin 109 slidably penetrates the center section of the piston rod 106 and a valve 110 which receives oil pressure of the lower side oil chamber 104 is attached to the lower end of the pin 109. An orifice passage 111 which communicates the lower side oil chamber 104 and the upper side oil chamber 105 is open and shut with the valve 110.

With the above structure, a total load of the operation panel 3 and the supporting column 4 is loaded to the attaching portion 107 of the piston rod 106. In cases that no operating force works on the pin 109, the piston 103 applies pressure on oil of the lower side oil chamber 104 by the total load including the operation panel 3, the supporting column 4, and the like. Then, the orifice passage 111 is closed with the valve 110. Accordingly, the total load of the operation panel 3 and the supporting column 4 is to be supported through oil pressure of the lower side oil chamber 104 as compressed gas in the compressed gas chamber 102 enclosed via the free piston 101 performs a function of a spring and acts as reaction force against the piston 103 without any movement of the piston 103.

Here, for example, when the total load including the operation panel 3 and the supporting column 4 and the like is to be approximately 40 kg, the operation panel 3 can be vertically moved smoothly with slight force by adopting a gas spring with the hydraulic lock having a specification of which gas reaction force is approximately 50 kg as being approximately 10 kg heavier than the total load.

Figure 7:
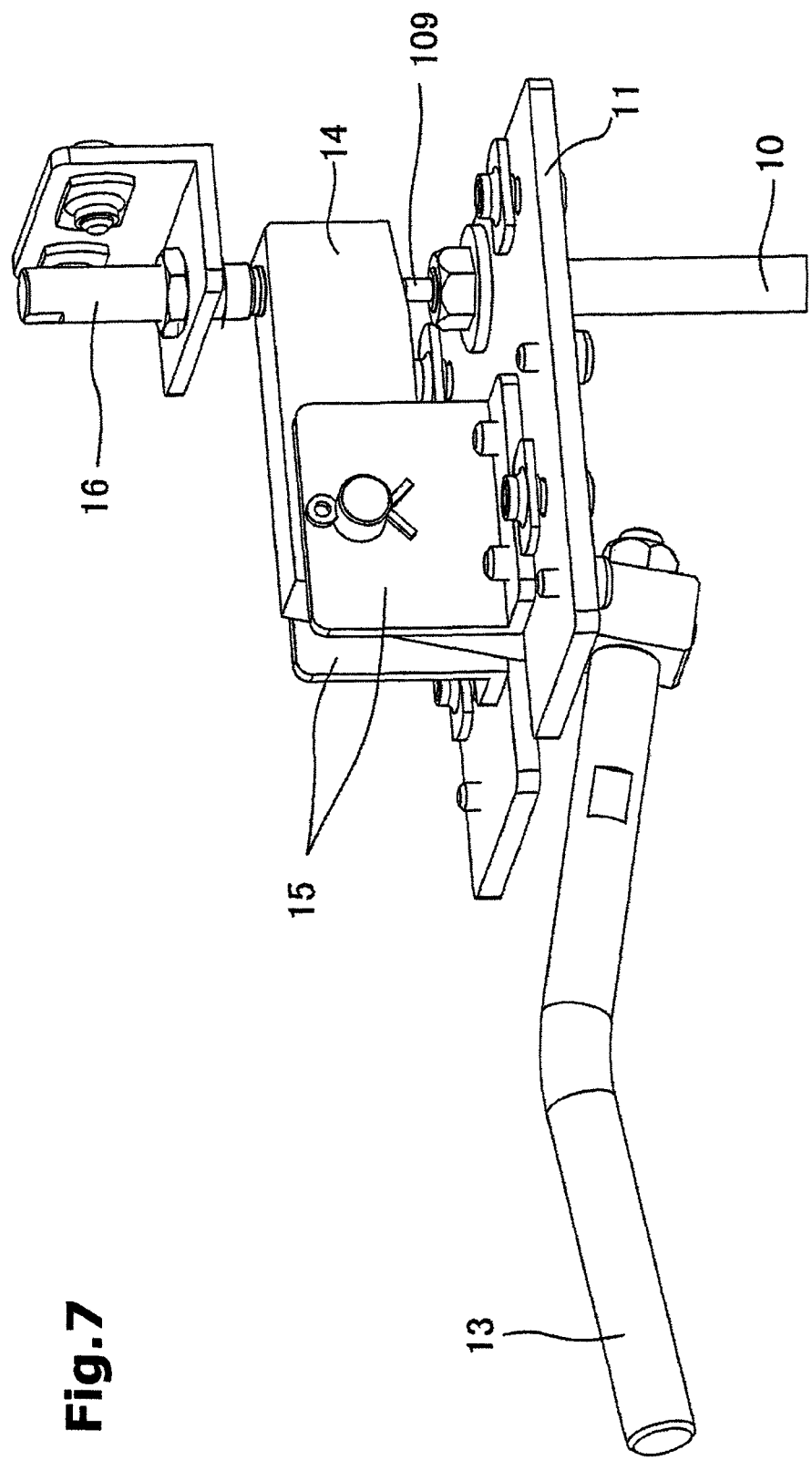
FIG. 7 is a view illustrating a lock releasing mechanism of the gas spring with the hydraulic lock.
Figure 8:
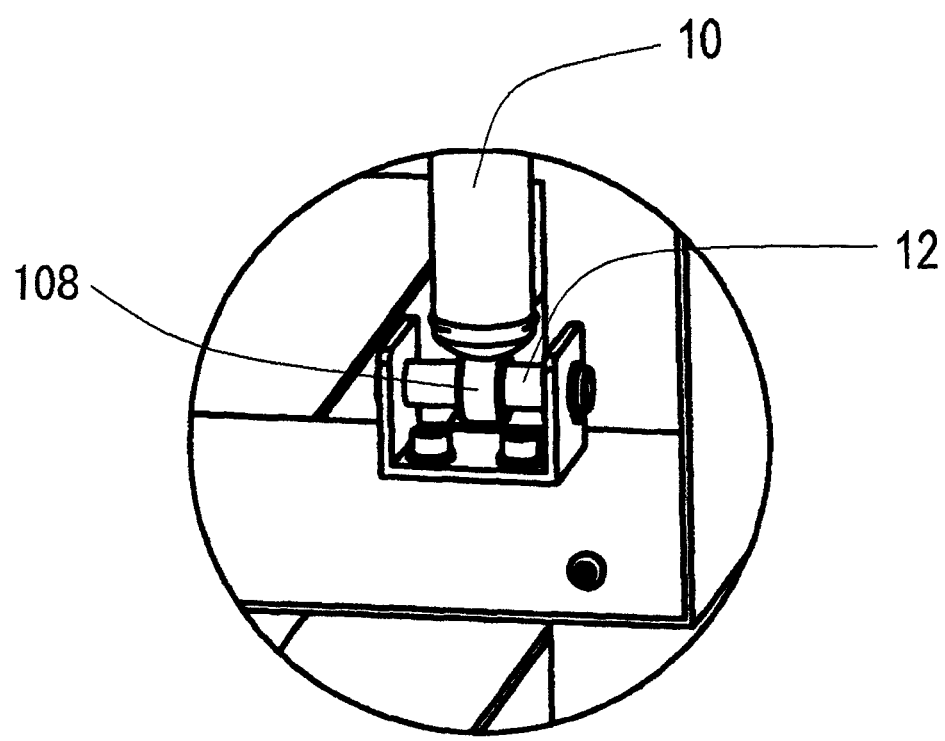
FIG. 8 is a view illustrating an attaching structure of the gas spring with the hydraulic lock.

As illustrated in FIG. 7, an L-shaped block 14 connected to a lever 13 is rotatably supported at the lever attaching plate 11 described above by brackets 15 arranged on both sides. Further illustrated in FIG. 7, the lower face of the end portion of the L-shaped block 14 is arranged to be opposed to the upper end of the pin 109 of the gas spring with the hydraulic lock 10 and to press thereto by fixing the lever attaching plate 11 to the bottom face of the U-shaped concave portion 4a of the supporting column 4 with bolts and the like. Here, a shock absorber 16 which suppresses rapid rising of the pin 109 by contacting with the upper face of the end portion of the L-shaped block 14 in an opposing manner is attached to the inner face of the U-shaped concave portion 4a of the supporting column 4.

Figure 9:
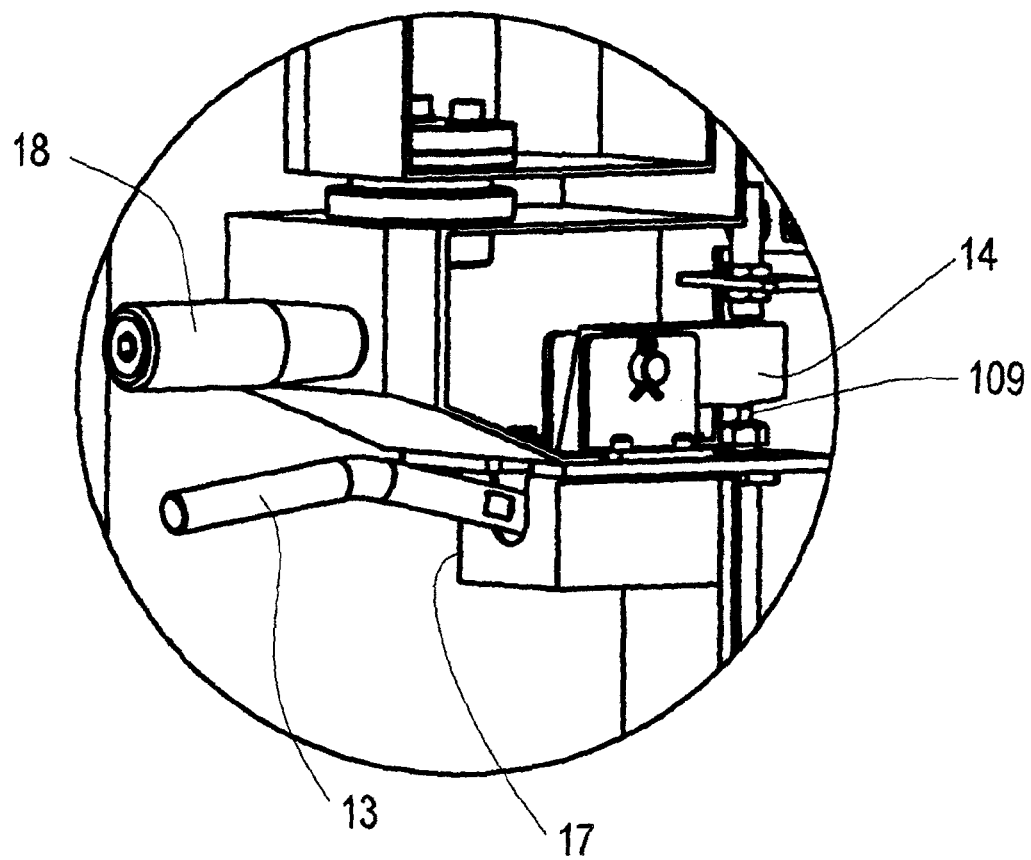
FIG. 9 is an enlarged view of a lever portion.

The lever 13 is normally descended until the upper face of the end portion of the L-shaped block 14 stops owing to the shock absorber 16 with the pin 109 returning to an upper position due to oil pressure which the valve 110 of the gas spring 10 receives. As illustrated in FIG. 9, the periphery of a connecting portion of the lever 13 and the L-shaped block 14 is covered by a cover 17 which is attached to the bottom face of the U-shaped concave portion 4a of the supporting column 4 in consideration of safety.

As illustrated in FIG. 9, a bar 18 for gripping is arranged on the front face of the lower end side of the U-shaped concave portion 4a of the supporting column 4 with a predetermined gap between the bar 18 and the lever 13 and a handling unit to adjust the vertical position of the operation panel 3 is constructed by the lever 13 and the bar 18. That is, the orifice passage 111 which is illustrated in FIG. 6 is opened as the lower face of the end portion of the L-shaped block 14 pushes the pin 109 of the gas spring with the hydraulic lock 10 when the lever 13 is pulled up with a finger other than a thumb such as an index finger as the operator holds the bar 18 having the base between the thumb and the index finger of the left hand abutted thereto. Then, the hydraulic lock is released as the lower side oil chamber 104 and the upper side oil chamber 105 of the piston 103 is communicated with the orifice passage 111. Then, operation force is to be applied to the bar 18 in a state as is in the vertical direction and the operation panel 3 is moved vertically due to this operation. The piston 103 moves vertically as oil flows from the upper side oil chamber 105 to the lower side oil chamber 104 or from the lower side oil chamber 104 to the upper side oil chamber 105. Thus, the height of the operation panel 3 can be vertically adjusted.

Since the total load of the operation panel 3 and the supporting column 4 is supported by the gas spring with the hydraulic lock 10 at that time, the operator is only required to apply slight operating force to the bar 18. As illustrated in FIG. 2, operability can be further improved by arranging a grip 19 extending in the vertical direction on the right side face of the operation panel 3 and by performing height adjustment as moving the operation panel 3 vertically in accordance with the above mentioned operation performed with the left hand while holding the grip 19 with the right hand.

By releasing the lever 13 at an optimal position for the operator as vertically moving the operation panel 3, the orifice passage 111 is closed with the valve 110 and the operation panel 3 can be stopped at the position.

As illustrated in FIG. 2, the lever 13 and the bar 18 as the handling unit for hydraulic lock releasing is disposed under the operation panel 3. Lifting and lowering operation of the operation panel 3 can be performed extremely easily by designing arrangement of the bottom side of the U-shaped concave portion 4a, the lever 13, and the bar 18 to be in the vicinity of an operator's hand being naturally lowered when the operator adjusts the operation panel 3 to the optimal position in accordance with one's height. That is, in a case that the position of the operation panel 3 is too low when an operator opposes the operation panel 3, power of the foot can be naturally utilized when lifting the operation panel 3 since the lever 3 and the bar 18 are held as dropping the hip. On the other hand, in a case that the position of the operation panel 3 is too high, the operation panel 3 can be lowered without burden as having one's weight on the bar 18.

When no braking is provided to the L-shaped block 14 which is connected to the lever 13 and the pin 109 of the gas spring with the hydraulic lock 10 is stopped by a stopper made of metal arranged on an inner face of the U-shaped concave portion 4a of the supporting column 4 at the time of automatically returning owing to oil pressure interlocked with releasing of the lever 13, metallic impact noise occurs as the L-shaped block 14 rapidly rises owing to oil pressure and crashes with the stopper which extremely lowers the quality of machines. Consequently, as illustrated in FIG. 7, occurrence of impact noise is prevented and the quality of machines is improved by suppressing rapid rise of the pin 109 as arranging the shock absorber 16 on the inner face of the U-shaped concave portion 4a of the support column 4 to contact against the upper face of the end portion of the L-shaped block 14.

Here, the shock absorber 16 includes a pin caved in a body as being abutted to the upper face of the end portion of the L-shaped block 14 when the lever 13 is not operated. The pin is descended to a standby position when the lever 13 is lifted for height adjustment and is gradually caved from the standby position when the pin is abutted to the end portion of the upper face of the L-shaped block 14 as the lever 13 is not operated after height adjustment is completed. To increase the ease of operation, it is preferable to utilize such type of a pin having an approximate 7 mm stroke from a caving position to the standby position.

In the above embodiment, the supporting column 4 is enabled to move vertically by attaching the operation panel 3 to the U-shaped concave portion 4a. However, not limited to the above, the operation panel 3 may be supported by the linear guide rail 8 which is arranged on the rear face of the side wall of the machining center 1 in a vertically movable manner by directly attaching the linear guide to the operation panel 3. Then, the bottom face of the operation panel 3 may be directly supported by the attaching portion 107 which is arranged on the piston rod 106 of the gas spring with the hydraulic lock 10 and the lever 13 and the bar 18 may be directly arranged in the space below the operation panel 3 as well as installing the wiring of the operation panel 3 in the machining center 1 via a slit separately arranged in the rear face of the side wall of the machining center 1.

In addition, various modifications are possible such as utilizing a grip handle type instead of the lever 13 and the bar 18 or arranging an up-down switch and driving the pin 109 of the gas spring with the hydraulic lock 10 with a compact motor or solenoid.

Further, a cushion material using low resilient resin may be utilized instead of the shock absorber 16 for cost reduction.

Industrial Applicability

As described above, according to a support structure of an operation panel for a machine tool of the present invention, since a load of the operation panel is supported by a gas spring with an hydraulic lock, the operation panel can be instantaneously adjusted to an optimal height in accordance with a height of an operator just by vertically moving the operation panel with slight force while operating the handling unit to release the hydraulic lock. Application to many machine tools including various machining center can be expected since work burden for operators can be reduced, operating errors can be prevented due to improvement of visuality, and yield ratio of the machine tool is not worsened as well.

REFERENCE SIGNS LIST

1 Machining center
2 Concave area of machining center
3 Operation panel
4 Supporting column
4a U-shaped concave portion
5 Upper area of concave portion

6 Spacer
7a Linear guide
8 Linear guide rail
10 Gas spring with hydraulic lock
13 Lever
14 L-shaped block
16 Shock absorber

The invention claimed is:

1. A support structure of an operation panel for a machine tool,
   wherein the operation panel is set to be capable of being vertically adjusted in position by attaching the operation panel to a housing side wall of the machine tool in a vertically movable manner, supporting a load of the operation panel by the housing side wall through a gas spring with a hydraulic lock, the gas spring being configured to support the load by an internal gas pressure and configured to be adjustable in a vertical direction, the gas spring including first and second hydraulic chambers and a compressed gas chamber, the compressed gas chamber being fluidly isolated from the hydraulic chambers by a first piston, the first hydraulic chamber physically separated from the second hydraulic chamber by a second piston, the hydraulic chambers being in selective fluid communication by a valve of the hydraulic lock, the valve being configured to lock the gas spring by blocking flow between the hydraulic chambers when engaged and to allow vertical adjustment of the gas spring by allowing flow between the hydraulic chambers when released, and placing a handling unit which releases the hydraulic lock of the gas spring at a vicinity of a lower side of the operation panel.

2. The support structure of the operation panel according to claim 1, wherein the handling unit includes a lever and a bar which are arranged to a lower front side of the operation panel; and the operation panel is set to be capable of being vertically adjusted in position by holding the bar and operating the lever to release the hydraulic lock of the gas spring.

3. The support structure of the operation panel according to claim 1, wherein a shock absorber is attached to the housing side wall so as to suppress returning speed when the handling unit stops releasing the hydraulic lock of the gas spring.

4. The support structure of the operation panel according to claim 1, wherein a supporting column having a U-shaped concave portion at a lower end thereof is attached to the housing side wall of the machine tool in a vertically movable manner; the operation panel is installed to an inside of the U-shaped concave portion; and a bottom face of the U-shaped concave portion is supported by the housing side wall through the gas spring with the hydraulic lock.

5. The support structure of the operation panel according to claim 4, wherein the supporting column is supported in a vertically movable manner by arranging a linear guide on a rear side of the U-shaped concave portion and engaging the linear guide with a linear guide rail arranged on an inner face of the housing side wall of the machine tool.

6. The support structure of the operation panel according to claim 2, wherein a shock absorber is attached to the housing side wall so as to suppress returning speed when the handling unit stops releasing the hydraulic lock of the gas spring.

7. The support structure of the operation panel according to claim 2, wherein a supporting column having a U-shaped concave portion at a lower end thereof is attached to the housing side wall of the machine tool in a vertically movable manner; the operation panel is installed to the inside of the U-shaped concave portion; and a bottom face of the U-shaped concave portion is supported by the housing side wall through the gas spring with the hydraulic lock.

* * * * *